US009529927B2

(12) United States Patent
Gang et al.

(10) Patent No.: US 9,529,927 B2
(45) Date of Patent: Dec. 27, 2016

(54) SYSTEM AND METHOD FOR PROVIDING MOBILE URL IN MOBILE SEARCH ENVIRONMENT

(71) Applicant: NAVER Corporation, Seongnam-si, Gyeonggi-do (KR)

(72) Inventors: Chun Sik Gang, Seongnam-si (KR); Seung Hwa Choo, Seongnam-si (KR)

(73) Assignee: Naver Corporation, Gyeonggi-do (KR)

( * ) Notice: Subject to any disclaimer, the term of this patent is extended or adjusted under 35 U.S.C. 154(b) by 188 days.

(21) Appl. No.: 14/183,984

(22) Filed: Feb. 19, 2014

(65) Prior Publication Data

US 2014/0289212 A1   Sep. 25, 2014

(30) Foreign Application Priority Data

Mar. 22, 2013  (KR) .................. 10-2013-0030794

(51) Int. Cl.
 *G06F 17/30*   (2006.01)
(52) U.S. Cl.
 CPC ............................ *G06F 17/30876* (2013.01)
(58) Field of Classification Search
 CPC .................. G06F 17/3082; G06F 17/30876
 See application file for complete search history.

(56) References Cited

U.S. PATENT DOCUMENTS

| | | | | |
|---|---|---|---|---|
| 6,300,947 | B1 * | 10/2001 | Kanevsky | G06F 17/30905 707/E17.121 |
| 7,143,342 | B1 * | 11/2006 | Baweja | G06F 17/30905 707/E17.121 |
| 2004/0235504 | A1 * | 11/2004 | Kohno | H04M 1/2535 455/466 |
| 2005/0050165 | A1 * | 3/2005 | Hamynen | G06F 17/30887 709/218 |
| 2005/0216829 | A1 * | 9/2005 | Kalinichenko | G06F 17/30371 715/205 |
| 2006/0212451 | A1 * | 9/2006 | Serdy, Jr. | G06F 17/30613 |
| 2007/0222734 | A1 * | 9/2007 | Tran | G06F 17/30755 345/98 |
| 2008/0033998 | A1 | 2/2008 | Rao et al. | |
| 2008/0040329 | A1 * | 2/2008 | Cussen | G06Q 30/02 |
| 2012/0303441 | A1 * | 11/2012 | Isobe | G06Q 30/0207 705/14.39 |
| 2013/0339487 | A1 * | 12/2013 | Wu | G06F 9/4843 709/219 |

(Continued)

FOREIGN PATENT DOCUMENTS

JP   2003-216525 A   7/2003
JP   2003-337823 A   11/2003

(Continued)

*Primary Examiner* — Shiow-Jy Fan
(74) *Attorney, Agent, or Firm* — Harness, Dickey & Pierce, P.L.C.

(57) ABSTRACT

Provided is a system and method for providing a mobile uniform resource locator (URL) in a mobile search environment. The system includes a collector configured to collect a mobile URL associated with a search target. The search target includes website information, where the website information is included in a search result of the search service. The system includes a determiner configured to determine a validity of the mobile URL. The system includes a provider configured to provide the mobile URL based on the determined validity of the mobile URL.

17 Claims, 4 Drawing Sheets

(56) References Cited

U.S. PATENT DOCUMENTS

2014/0129733 A1* 5/2014 Klais .................... H04L 67/327
                                                    709/239
2014/0222948 A1* 8/2014 Terasawa ............... G06F 13/00
                                                    709/213

FOREIGN PATENT DOCUMENTS

| JP | 2008-250941 A | 10/2008 |
| JP | 2011-248857 A | 12/2011 |
| KR | 20080096173 A | 10/2008 |
| KR | 2011-0130013 A | 12/2011 |

* cited by examiner

SYSTEM AND METHOD FOR PROVIDING MOBILE URL IN MOBILE SEARCH ENVIRONMENT

CROSS-REFERENCE TO RELATED APPLICATION

This application claims priority from and the benefit of Korean Patent Application No. 10-2013-0030794, filed on Mar. 22, 2013, which is hereby incorporated by reference in its entirety for all purposes as if fully set forth herein.

BACKGROUND

Field

Example embodiments relate to a system and method for providing a mobile uniform resource locator (URL) that may improve a use rate of a mobile URL in a mobile search environment.

Description of the Background

With the development in information technology (IT), the transition into an information-oriented society has been quickly ongoing, and accordingly, the Internet has become important and essential media for society, culture, and the economy.

Internet search engines are software systems that allow internet users to search for, and retrieve desired information, typically in the form of a website or one or more webpages, from large amounts of information being uploaded to, or otherwise placed on the Internet. Search engines allow for users to obtain information without a need to be fully aware of uniform resource locator (URL) information of websites.

Describing a principle of the search engine, a search program called a web robot (or alternatively, a "bot" or "internet bot"), a spider program (or alternatively, a "spider"), web crawler, and the like may store, in a database in advance, website information collected by visiting a plurality of websites opened on the Internet. The search programs may select, from the database, a website including a description that matches a keyword input from a user, and may provide the website to the user.

To outperform an issue that a large number of websites are provided with respect to a keyword, each of search sites providing a search engine may provide a shortcut service to a corresponding keyword. Korea Laid Open Publication No. 10-2008-0096173, published on Oct. 30, 2008, discloses a search service providing apparatus and a method thereof that may provide an efficient shortcut service to a keyword.

In a search environment using a mobile device, a request for using a mobile website (hereinafter, a mobile URL) optimized for a mobile environment is increasing. A mobile URL and a URL (hereinafter, a personal computer (PC) URL) of a PC website optimized for a PC environment may be provided together as a search result about shortcut to a keyword.

However, a website operator may need to periodically register a shortcut website corresponding to each keyword for a shortcut service, and thus, it may be difficult to update and manage shortcut websites. Further, in an existing search environment, a mobile URL of a website may not be included in a shortcut search result or a website search result before an operator directly registers the mobile URL of the website to a database, which leads to a low use rate of the mobile URL.

SUMMARY

Example embodiments relate to a system and method for providing a mobile uniform resource locator (URL) that may automatically collect a mobile URL of a website and thereby apply the collected mobile URL to a search result.

According to one example embodiment, a mobile uniform resource locator (URL) providing system for providing a search service to a mobile terminal is provided. The system includes a collector configured to collect a mobile URL associated with a search target. The search target includes website information, where the website information is included in a search result of the search service. The system includes a determiner configured to determine a validity of the mobile URL. The system includes a provider configured to provide the mobile URL based on the determined validity of the mobile URL.

Example embodiments provide that, in the collecting, the collector is configured to collect the mobile URL using characteristic information associated with a user agent of a mobile device.

Example embodiments provide that, in the collecting, the collector is configured to collect the mobile URL by extracting the mobile URL from link information that is associated with a personal computer (PC) URL of the search target.

Example embodiments provide that, in the collecting, the collector is configured to collect the mobile URL by extracting the mobile URL from a web document associated with the search target.

Example embodiments provide that, in the collecting, the collector is configured to collect the mobile URL by extracting the mobile URL from a uniform resource identifier (URI) of a landing page of the search target.

Example embodiments provide that, in the determining, the determiner is configured to determine the validity of the mobile URL based on at least one attribute associated with the mobile URL. The at least one attributing may be at least one of a value indicating to redirect the collected mobile URL, a value indicating whether a mobile option is included in a meta tag, and a value indicating that a URL string pattern has been verified.

Example embodiments provide that, in the collecting, the collector is configured to collect the mobile URL when a PC URL of the website information is included in the search result.

Example embodiments provide that the determiner is further configured to determine a validity of a mapping of the mobile URL to a PC URL of the search target, the validity of the mapping is based on the at least one attribute.

Example embodiments provide that, in the providing, the provider is configured to add the mobile URL to the search result when a PC URL is included in the website information of the search target and the PC URL is display as the search result.

According to another example embodiment, a mobile uniform resource locator (URL) providing method for providing a mobile URL to a mobile terminal using a search service. The method includes collecting a mobile URL associated with a search target. The search target includes website information, and the website information may be included in a search result of the search service. The method includes determining a validity of the mobile URL. The method includes providing the mobile URL based on the determining.

Example embodiments provide that the collecting further includes collecting the mobile URL using characteristic information associated with a user agent of the mobile terminal.

Example embodiments provide that the collecting further include collecting the mobile URL by extracting the mobile URL from link information that is associated with a personal computer (PC) URL of the search target s.

Example embodiments provide that the collecting includes collecting the mobile URL by extracting the mobile URL from a web document associated with the search target.

Example embodiments provide that the collecting includes collecting the mobile URL by extracting the mobile URL from a uniform resource identifier (URI) of a landing page of the search target.

Example embodiments provide that the collecting includes collecting the mobile URL when a PC URL of the website information is included in the search result.

Example embodiments provide that the determining includes determining the validity of the mobile URL based on at least one attribute associated with the mobile URL. The at least one attribute being at least one of a value indicating whether to redirect the collected mobile URL, a value indicating whether a mobile option is included in the meta tag, and a value indicating that a URL string pattern has been verified.

Example embodiments provide that the determining includes determining a validity of a mapping of the mobile URL to a PC URL of the search target, the validity of the mapping being based on the at least one attribute.

Example embodiments provide that the providing includes adding the mobile URL to the search result when a PC URL is included in the website information of the search target and the PC URL is displayed the search result.

Example embodiments provide that a non-transitory computer non-transitory computer-readable storage medium comprises instructions that, when executed by a processor, control a computer system to provide a search service to a mobile terminal by collecting a mobile URL associated with a search target, the search target including website information, the website information being included in a search result of the search service; determining a validity of a mobile URL; and providing the mobile URL as the search result based on the determined validity of the mobile URL.

According to another example embodiment, a mobile uniform resource locator (URL) providing sever for providing a search service to a mobile terminal is provided. The server is configured to receive a search query from the mobile terminal. The server is configured to collect a mobile URL associated with a search target. The search target is to be provided to the mobile terminal as part of a search result based on the received search query. The server is configured to provide the mobile URL to the mobile terminal.

Example embodiments provide that the server is configured to collect the mobile URL using characteristic information associated with a user agent of the mobile terminal, the characteristic information including at least one of an application type, operating system (OS) information, a software vendor, a software version, a URL, and an email address.

Example embodiments provide that the search query is to be provided to a third party search service, and in the receiving, the server is further configured to intercept the search query.

Example embodiments provide that the search query is to be provided to a third party search service, and in the providing, the server is configured to insert the mobile URL into the search result.

Example embodiments provide that, in the providing, the server is further configured to determine a user demand associated with the mobile URL, and provide the mobile URL to the mobile terminal based on the determined user demand.

It is to be understood that both the foregoing general description and the following detailed description are explanatory and are intended to provide further explanation of the example embodiments as claimed.

BRIEF DESCRIPTION OF THE DRAWINGS

The accompanying drawings, which are included to provide a further understanding of the example embodiments and are incorporated in and constitute a part of this specification, illustrate example embodiments, and together with the description serve to explain the principles of the example embodiments.

DETAILED DESCRIPTION OF EXAMPLE EMBODIMENTS

Figure 1:
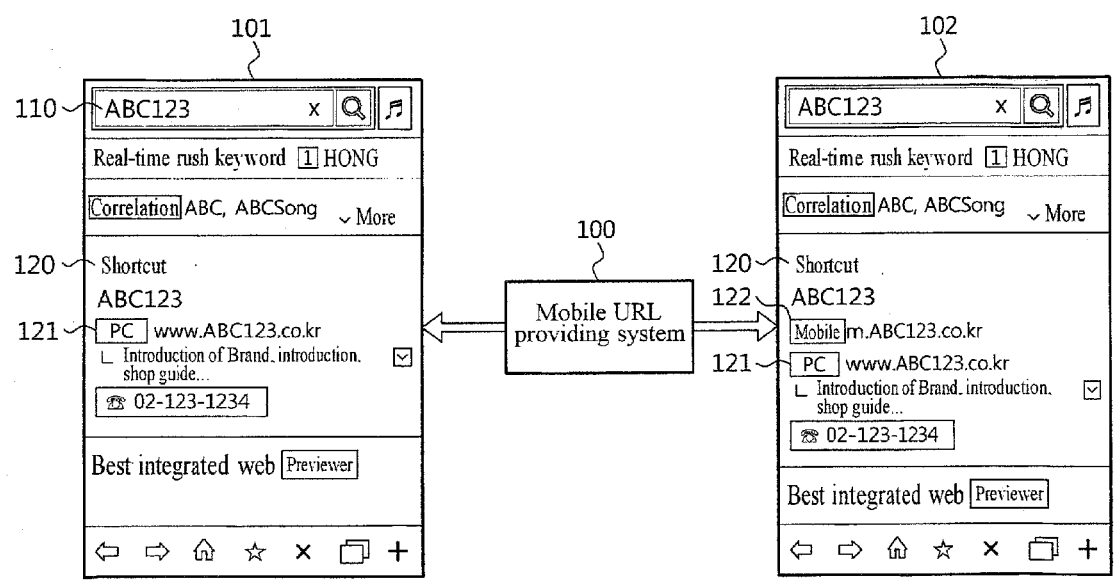
FIG. 1 illustrates an example of a search service providing a search result corresponding to a keyword in a mobile environment according to example embodiments.

The invention is described more fully hereinafter with reference to the accompanying drawings, in which example embodiments are shown. This invention may, however, be embodied in many different forms and should not be construed as limited to the example embodiments set forth herein. Rather, these example embodiments are provided so that this disclosure is thorough, and will fully convey the scope of the invention to those skilled in the art. In the drawings, the size and relative sizes of layers and areas may be exaggerated for clarity. Like reference numerals in the drawings denote like elements.

Example embodiments will now be described more fully with reference to the accompanying drawings in which example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments to those of ordinary skill in the art. In the drawings, the thicknesses of layers and areas are exaggerated for clarity. Like reference numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, areas, layers and/or sections, these elements, components, areas, layers and/or sections should not be limited by these terms. These terms are only used to distinguish one element, component, area, layer or section from another element, component, area, layer or section. Thus, a first element, component, area, layer or section discussed below could be termed a second element, component, area, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of areas illustrated herein but are to include deviations in shapes that result, for example, from manufacturing. For example, an implanted area illustrated as a rectangle will, typically, have rounded or curved features and/or a gradient of implant concentration at its edges rather than a binary change from implanted to non-implanted area. Likewise, a buried area formed by implantation may result in some implantation in the area between the buried area and the surface through which the implantation takes place. Thus, the areas illustrated in the figures are schematic in nature and their shapes are not intended to illustrate the actual shape of an area of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, example embodiments are described in detail with reference to the accompanying drawings.

Example embodiments may be applied to a search system that may retrieve information matching a predetermined condition from among materials present in the Internet.

According to example embodiments, it is possible to automatically collect a mobile uniform resource locator (URL) of a website of which the mobile URL is not included in a search result of a search service, and to apply the collected mobile URL to the search result.

Also, according to example embodiments, it is possible to apply a target having a relatively high accuracy level to a search result by directly evaluating a validity of a mobile redirect URL collection target and selecting a mobile URL to be added to the search result.

Also, according to example embodiments, it is possible to improve the awareness of a mobile website and a use rate of a mobile URL by displaying a mobile URL in a search result in a mobile search environment.

FIG. 1 illustrates an example of a search service system providing a search result corresponding to a keyword to a user terminal in a mobile environment according to example embodiments. The search service system includes mobile URL providing system 100, mobile terminal 101, and mobile terminal 102.

Mobile terminals 101 and 102 may be any hardware computing device capable of providing communications services via a cellular network, computer network, and/or other like communications network. In various embodiments, mobile terminals 101 and 102 may be capable of communicating with a server (e.g., mobile URL providing system 100), such that each of the mobile terminals 101 and 102 are able to receive services from a server. Mobile terminals 101 and 102 may include memory, one or more processors, and a transceiver. Mobile terminals 101 and 102 may be configured to send/receive data to/from network devices, such as a router, switch, or other like network devices. Mobile terminals 101 and 102 may be designed to sequentially and automatically carry out a sequence of arithmetic or logical operations; equipped to record/store digital data on a machine readable medium; and transmit and receive digital data via one or more network devices. Mobile terminals 101 and 102 may include a wireless transceiver configured to operate in accordance with wireless communications standard. The term "mobile terminal", "mobile device", "client device", and the like as used herein may refer to any hardware computing device having portability or mobility, such as a smart phone, a laptop computer, a digital broadcasting terminal, video cameras, digital photo cameras, an MP3 player, a tablet PC, a portable medial player (PMP), navigation device, and/or any logical device capable of capturing/recording, storing, and/or transferring data via a communications network.

According to various embodiments, mobile URL providing system 100 may be a physical computer hardware system that is configured to provide services for mobile terminals (e.g., mobile terminals 101 and 102) connected to a network, such as the internet, a Wide Area Network (WAN), a personal area network (PAN), local area network (LAN), campus area network (CAN), metropolitan area network (MAN), a virtual local area network, and/or any other like network capable of physically or logically connecting computers (not shown). Mobile URL providing system 100 may be a server or other like network element that employs one or more connection-oriented protocols such as Session Initiation Protocol (SIP), HTTP, and TCP/IP, and includes network devices that use connectionless protocols such as User Datagram Protocol (UDP) and Internet Packet Exchange (IPX). Mobile URL providing system 100 may be configured to establish, manage, and terminate communications sessions, for example between the mobile URL providing system 100 and one or more of the mobile terminals 101 and 102. Mobile URL providing system 100 may also be configured to establish, manage, and terminate communications sessions with two or more client devices.

In various embodiments, mobile URL providing system 100 may provide an internet search service to one or more mobile terminals (e.g., mobile terminals 101 and 102). In various embodiments, mobile URL providing system 100 may perform the functions of an internet search engine. In such embodiments, one or more search engine results pages (SERPs) may be provided by mobile URL providing system 100 to one or more mobile terminals (e.g., mobile terminals 101 and 102). In addition to providing search results, in various embodiments, other types of search-related data may be provided, such as contextual, algorithmic and/or organic search listings, sponsored listings, images, maps, definitions, videos, suggested search refinements, metadata, and/or other like search-related data. In some embodiments, a third-party search service provider (not shown) may provide mobile URL providing system 100 with search results and/or URL data for the internet search services.

According to various embodiments, mobile URL providing system 100 is connected to one or more local and/or remote databases (not shown). In various embodiments, the databases may include a database management system ("DBMS"), such as a relational database management system ("RDBMS") database, an object database ("ODBMS"), column-oriented DBMS, correlation database DBMS, and the like. In various embodiments, the one or more databases may collect and/or store URL data and/or other like search-related data for internet search services. Additionally, the one or more databases may be configured to receive queries from mobile URL providing system 100 and provide the SERPS and/or other like search-related data to the mobile URL providing system 100 according to the received query.

It should be noted that the term "search service" may refer to any type of search service that may include displaying a website address in a search result, such as a shortcut service, a website search service, a keyword search service, a search engine search results webpage, and the like.

Referring to FIG. 1, a search result of a shortcut 120 in which website information is included may be provided in response to a keyword 110 as one type of a search service. In such a shortcut service, a uniform resource locator (URL) of a shortcut web site corresponding to the keyword 110 may be included in the search result. Referring to a screen of mobile terminal 101, in many cases, only a personal computer (PC) URL 121 may be displayed. A mobile URL may not be displayed before an operator registers the mobile URL to a database.

In a mobile search environment, when a mobile URL having a relatively high use rate is present, a shortcut click through ratio (CTR) may increase. However, a case in which a mobile URL is present at a shortcut website corresponding to each keyword may be rare.

Referring to a screen of mobile terminal 102 of FIG. 1, the mobile URL providing system 100 may provide a mobile URL according to example embodiments. The mobile URL providing system 100 may be configured to collect a mobile URL 122 with respect to a target of which the mobile URL is not included among search targets. Website information of the search targets is included in a search result that is provided by a search service. In various embodiments, the mobile URL providing system 100 may be configured to automatically add the collected mobile URL 122 to the provided search result of the shortcut 120 in which only the PC URL 121 is included. In some embodiments, the mobile URL providing system 100 may be configured to determine that a mobile terminal (e.g., mobile terminals 101 and 102) is requesting a search result in response to a search query, intercept or otherwise obtain a SERP to be provided to the mobile terminal in response to the search query, and insert the mobile URL into the SERP prior to the SERP being provided to the mobile terminal.

In various embodiments, a mobile URL may be automatically provided in a SERP based on a user participation and/or other measure of demand for a mobile URL. For example, a demand for a mobile URL may include measuring a click-through-rate (CTR) to determine a number of users that click a desired URL Additionally, in some embodiments, a user participate may also take into account a determination of users accessing the desired URL using a mobile terminal versus users accessing the desired URL using a non-mobile computing device. Based on the user participation, a mobile URL may be provided by collecting a mobile URL using a web crawl robot and by including both corresponding information and a PC URL in a search result. According to example embodiments, dissimilar to an existing collecting method using a robot, a mobile URL may be automatically collected and evaluated by collectively analyzing a user agent (UA), a meta tag, a URL pattern, and the like.

Figure 2:
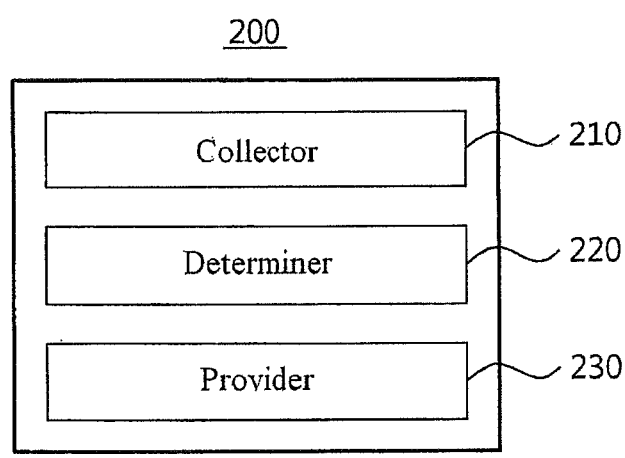
FIG. 2 illustrates an example of an internal configuration of a system for providing a mobile uniform resource locator (URL) according to example embodiments.

FIG. 2 illustrates an example of an internal configuration of a mobile URL providing system 100 according to example embodiments. Referring to FIG. 2, the mobile URL providing system 200 may include a collector 210, a determiner 220, and a provider 230. In some embodiments, the mobile URL providing system 100 may include many more components than those shown in FIG. 2. However, it is not necessary that all of these generally conventional components be shown in order to disclose the illustrative embodiment. For example, mobile URL providing system 100 may also include a one or more processors, one or more memory devices, a display, a transceiver, and/or other like components.

The mobile URL providing system 100 may include one or more memory devices. The memory may be a computer readable storage medium that generally includes a random access memory (RAM), read only memory (ROM), and a permanent mass storage device, such as a disk drive. The memory may also store an operating system and program code for providing a mobile URL. These software components may also be loaded from a separate computer readable storage medium into memory using a drive mechanism (not shown). Such separate computer readable storage medium may include a floppy drive, disc, tape, DVD/CD-ROM drive, memory card, or other like computer readable storage medium (not shown). In some embodiments, software components may be loaded into memory via a network interface (not shown), rather than via a computer readable storage medium.

The mobile URL providing system 100 may include a network interface. A network interface is a computer hardware component that connects mobile URL providing system 100 to a computer network (e.g., the internet). The network interface may connect the mobile URL providing system 100 to a computer network via a wired or wireless connection.

The mobile URL providing system 100 may also include one or more processors. A processor may be configured to carry out instructions of a computer program by performing the basic arithmetical, logical, and input/output operations of the system. Instructions may be provided to a processor by a memory device or by a network interface. In various embodiments, the processor is configured to execute program code for collector 210, determiner 220, and provider 230.

The collector 210 may be configured to collect a mobile URL associated with a search target of a search query. The search target includes website information associated with a search result provided by a search service. Here, the website information may refer to resource information on a computer network including a website name and address, a directory location at which a file is present, a file name, one or more pieces of metadata associated with the website, and the like. The website information may be classified into a URL (PC URL) of a PC website optimized for a PC environment and a mobile website (mobile URL) optimized for a mobile environment. For example, the collector 210 may collect a mobile URL by determining, as a target, a PC URL in which the mobile URL is not included in a search result of a search service.

According to example embodiments, a desired (or alternatively, "predetermined") search program (e.g., a web crawl robot, internet bot, a spider program, and the like) may be used to collect a mobile URL. Here, the collector 210 may collect a mobile URL by changing a user agent (UA) with a mobile device, (e.g., ANDROID, iPhone, and the like) or otherwise use a characteristic information associated with a UA of a mobile device. A UA may be an application that acts on behalf of a user. When a UA operates in a network, the UA transmit characteristic information that identifies the UA. The characteristic information may be included in a header of a message when using the HTTP, SIP, and/or SMTP/NNTP communications protocols. Such characteristic information may include an application type, operating system (OS) information, a software vendor, a software version, a URL, an email address, and/or other like information. In various embodiments, after changing a UA with the mobile device or otherwise obtaining the characteristic information associated with the UA of the mobile device, the collector 210 may collect a mobile URL by extracting mobile/mobile web related information from a link name, anchor text, and/or link information collected from a PC URL of a search target.

In various embodiments, the collector 210 may collect a mobile URL by extracting mobile/mobile web related information from a web document associated with a search target. For example, the collector 210 may extract a mobile URL from an Internet publication associated with a search target, such as a document or news within a website of a PC URL, a blog, a café, and the like. As another example, in response to a user's selection a PC URL from a search result, the collector 210 may collect a mobile URL by extracting the mobile URL from a uniform resource identifier (URI) of a landing page of a search target that is to be displayed to a user terminal and/or a mobile device when the user terminal and/or mobile device selects one of a plurality of links of a search result. According to example embodiments, a mobile URL may be extracted using a method of verifying a URI pattern, that is, a pattern verified using the mobile URL, for example, "m.XXXX.XXXX", "XXX.XXX.XXX/m", "mobile.XXXX.XXXX, "XXX.XXX.XXX/mobile", and the like, a method of verifying mobile related information from a meta tag, and the like.

The determiner 220 may be configured to determine a validity of the collected mobile URL. The determiner 220 may select a target URL (e.g., a search target) having a relatively high accuracy level from among mobile redirect URL collection targets. At least one of the mobile redirect URL collection targets may be associated with a PC URL in which a mobile URL is not included in a search result of a search service. The determiner 220 may then apply the selected target to the search result.

According to example embodiments, the determiner 220 may select a valid mobile URL based on at least one attribute among whether to redirect the collected mobile URL, which is expressed by "true/false (T/F)", whether a mobile option is included in a meta tag, which is expressed by "T/F", and whether a string and/or a string pattern is verified using the mobile URL, which is expressed by "T/F". Here, to improve the accuracy of the mobile URL, the determiner 220 may determine that a target having a "T" value with respect to two out of the above three attributes or all of the three attributes is a valid mobile URL. Even though the mobile URL is not included in the search result, the determiner 220 may use the above three attributes to determine a validity of an existing mapping of the mobile URL when the mobile URL is mapped to a PC URL of the search target. For example, the validity of existing mapping information with respect to a PC URL may be verified by applying the aforementioned method of determining that a target having "T" with respect to all of the above three attributes is a valid mobile URL. Although the above example embodiment includes three attributes to be considered for verifying a valid mobile URL, in various embodiments, more or less than the above three attributes may be considered. Additionally, any other type of attribute may be considered when determining the validity of a mobile URL.

The provider 230 may provide the mobile URL selected through the validity verification as the search result of the search service. For example, the provider 230 may automatically add the mobile URL selected through the process to the search result in which only the PC URL in website information of the search target is included and thereby display the search result to which the mobile URL is added.

Accordingly, example embodiments may automatically collect a mobile URL with respect to a website of which the mobile URL is not included in a search result of a search service and may apply the collected mobile URL to the search result. According to various embodiments, an awareness and a use rate of the mobile URL with respect to the corresponding website may be increased and/or improved.

Figure 3:
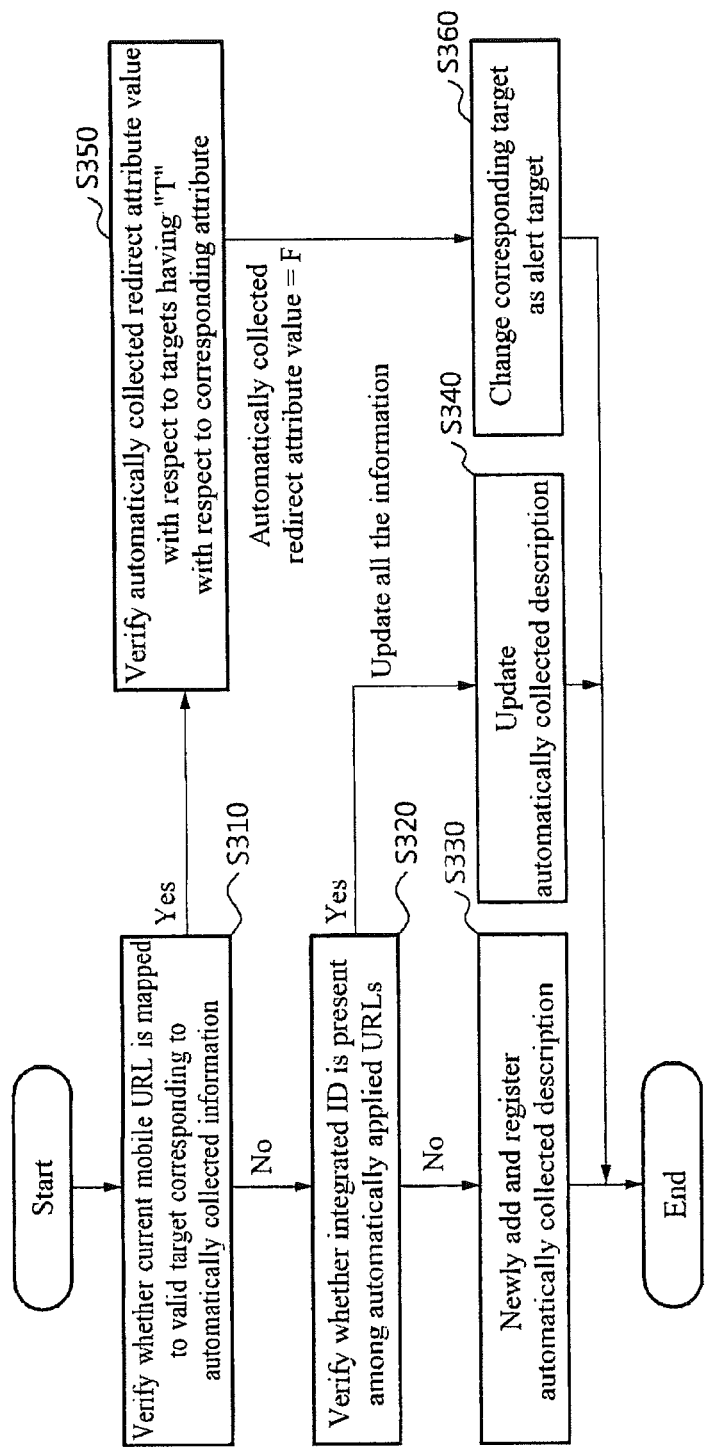
FIGS. 3 and 4 each illustrate an example of a method of providing a mobile URL according to example embodiments.
Figure 4:
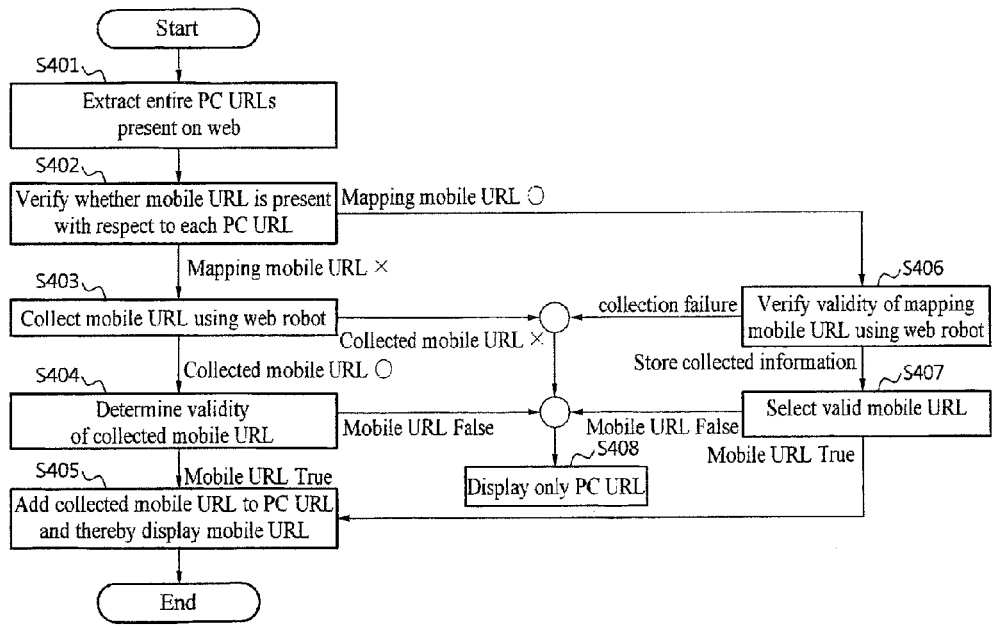

FIGS. 3 and 4 each illustrate an example of a method of providing a mobile URL according to example embodiments. The method of providing a mobile URL according to example embodiments may be performed by a mobile URL providing system 100 described above with reference to FIG. 2.

According to example embodiments, it is possible to update and thereby apply a collected URL to an integrated ID. Here, to store a PC URL and a mobile URL having different URL characteristics with respect to a single object, such as a serial number, an integrated ID may be assigned to a document. Due to a variable URL, a corresponding ID may be mapped to the URL. That is, an integrated ID is used to map or otherwise associated the PC URL with the mobile URL, and the PC URL that includes variable information may be modified during a collection period. Accordingly, a corresponding integrated ID may be transmitted to secure the permanency and find a target.

Referring to FIG. 3, in operation S310, the mobile URL providing system 100 verifies whether a current mobile URL is mapped to a valid target corresponding to automatically collected information. As discussed above, in various embodiments, a mobile URL may be validated if one or more attributes are designated as having a "T" value. Thus, a current mobile URL may be verified if a target having a "T" value with respect to at least one attribute among whether a mobile option is included in a meta tag and/or whether a string and/or string pattern is verified using a mobile URL.

When a current mobile URL is not mapped, the mobile URL providing system 100 proceeds to operations S320 to verify whether an integrated ID is present among automatically applied URLs. When the integrated ID is absent, the mobile URL providing system 100 proceeds to operation S330 to newly add and thereby register a mobile URL using an automatically collected description.

Referring back to operation S320, when the integrated ID is present among automatically applied URLs, the mobile URL providing system 100 proceeds to operation S340 to update information on the mobile URL with the automatically collected description.

Referring back to operation S310, when the current mobile URL is mapped to a valid target, the mobile URL providing system 100 proceeds to operation S350 to verify an automatically collected redirect attribute value with respect to targets having a "T" value with respect to an attribute. As shown in operation S360, when the automatically collected redirect attribute value is "F", the mobile URL providing system 100 may change a corresponding target as an alert target in order to verify whether to perform a redirection in operation.

Hereinafter, a method of providing a mobile URL according to example embodiments is described with reference to FIG. 4.

As shown in operation S401, the entire PC URLs present on a web of webpages is extracted. As shown in operation S402, the mobile URL providing system 100 verifies whether a mobile URL is present with respect to each PC URL, that is, whether a mapping of the mobile URL is present with respect to each PC URL.

When a mobile URL mapped to a PC URL is absent, the mobile URL providing system 100 proceeds to operations S403 to collect a mobile URL of a corresponding PC URL using a web robot. The mobile URL providing system 100 may collect a mobile URL by changing a user agent with a mobile device or otherwise utilizing characteristic information associated with the user agent of the mobile device. As an example, the mobile URL providing system 100 may collect a mobile URL by extracting mobile/mobile web related information from a link name (anchor text) and link information collected from a PC URL of a search target. As another example, the mobile URL providing system 100 may collect a mobile URL by extracting mobile/mobile web related information from a web document, for example, a publication such as a document or news within a corresponding website, a blog, a café, and the like. As another example, in response to a user's selection on a PC URL, the mobile URL providing system 100 may collect a mobile URL by extracting the mobile URL from a URI of a final landing page on a mobile device of the user.

In operation S404, the mobile URL providing system 100 may determine a validity of the collected mobile URL. Here, the mobile URL providing system 100 may select a valid mobile URL based on at least one attribute among whether to redirect the collected mobile URL (T/F), whether a mobile option is included in a meta tag (T/F), and/or whether a string is verified using the mobile URL (T/F). When the collected mobile URL is determined to be valid, the mobile URL providing system 100 proceeds to operation S405 to add the collected mobile URL to the corresponding PC URL and thereby display the collected mobile URL and the corresponding PC URL as a search result. When the mobile URL providing system 100 fails in collecting a mobile URL with respect to a PC URL to which the mobile URL is not mapped, or when the collected mobile URL is not valid information, the mobile URL providing system 100 proceeds to operation S408 to display only the corresponding PC URL as a search result.

Referring back to operation S402, when the mobile URL mapped to the PC URL is present, the mobile URL providing system 100 proceeds to operation S406 to verify a validity of the corresponding mobile URL using a web robot. The mobile URL providing system 100 may collect and store a URI and an attribute value of a final landing page on a mobile device of the user with respect to the PC URL. The attribute value may include "T/F" with respect to whether to redirect the collected mobile URL, whether a mobile option is included in a meta tag, and whether a string is verified using the mobile URL. In operation S407, the mobile URL providing system 100 may select a valid mobile URL based on at least one attribute among whether to redirect the mobile URL mapped to the PC URL, whether the mobile option is included in a meta tag, and/or whether the string is verified using the mobile URL.

Referring back to operation S404, when the mobile URL mapped to the PC URL is determined to be valid, the mobile URL providing system 100 proceeds to operation S405 to add the valid mobile URL to the corresponding PC URL and thereby display the valid mobile URL and the PC URL as a search result. When the mobile URL providing system 100 fails in collecting a URI and an attribute value of a final landing page with respect to the PC URL to which the mobile URL is mapped, or when the mapping of the mobile URL is determined to not include valid information or is otherwise invalid, the mobile URL providing system 100 proceeds to operation S408 to display only the corresponding PC URL as the search result.

The aforementioned mobile URL providing method may include shortened operations or added operations based on a detailed description of the mobile URL providing system described above with reference to FIGS. 1 through 3. Also, at least two operations may be combined and orders or locations of operations may be changed.

As described above, according to example embodiments, it is possible to automatically collect a mobile URL of a website of which the mobile URL is not included in a search result of a search service, and to apply the collected mobile URL to the search result. Also, according to example embodiments, it is possible to apply a target having a relatively high accuracy level to a search result by evaluating a validity of a mobile redirect URL collection target and selecting a mobile URL to be added to the search result. Also, according to example embodiments, it is possible to improve an awareness of a mobile website and a use rate of a mobile URL by displaying a mobile URL in a search result in a mobile search environment.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

It will be apparent to those skilled in the art that various modifications and variation can be made in the example embodiments without departing from the spirit or scope of the invention. Thus, it is intended that the example embodiments cover the modifications and variations of this invention provided they come within the scope of the appended claims and their equivalents.

What is claimed is:

1. A mobile uniform resource locator (URL) providing system for providing a search service to a mobile terminal, the system comprising:
   a memory having computer readable instructions stored thereon; and
   at least one processor configured to execute the computer readable instructions to,
      collect a mobile URL associated with a search target of a search query received from the mobile terminal, the search target including website information, the website information is included in a search result of the search service, the mobile URL associated with a website of the search target designed for display on a mobile environment;
      map the collected mobile URL with a personal computer (PC) URL associated with the search target;
      determine a validity of the mobile URL by determining that the mapped mobile URL redirects a web browser, includes a mobile option in a metatag, or has a mobile related character string in the mapped mobile URL,
      wherein the at least one processor is further configured to determine a validity of a mapping of the mobile URL to the PC URL of the search target, the validity of the mapping is based on at least one of a value indicating to redirect the collected mobile URL, a value indicating whether a mobile option is included in a meta tag, and a value indicating that a URL string pattern has been verified; and
      provide the valid mobile URL in the search result based on the determined validity of the mobile URL by including the mobile URL with the PC URL associated with the search target in the search result when the PC URL is included in the website information of the search target and the PC URL is displayed in the search result.

2. The system of claim 1, wherein, in the collecting, the at least one processor is configured to collect the mobile URL using characteristic information associated with a user agent of a mobile device.

3. The system of claim 1, wherein, in the collecting, the at least one processor is configured to collect the mobile URL by extracting the mobile URL from link information that is associated with the PC URL of the search target.

4. The system of claim 1, wherein, in the collecting, the at least one processor is configured to collect the mobile URL by extracting the mobile URL from a web document associated with the search target.

5. The system of claim 1, wherein, in the collecting, the at least one processor is configured to collect the mobile URL by extracting the mobile URL from a uniform resource identifier (URI) of a landing page of the search target.

6. The system of claim 1, wherein, in the collecting, the at least one processor is configured to collect the mobile URL when the PC URL of the website information is included in the search result.

7. A mobile uniform resource locator (URL) providing method for providing a mobile URL to a mobile terminal using a search service, the method comprising:
   collecting, using at least one processor, a mobile URL associated with a search target of a search query received from the mobile terminal, the search target including website information, the website information being included in a search result of the search service, the mobile URL associated with a website of the search target designed for display on a mobile environment;
   mapping, using the at least one processor, the collected mobile URL with a personal computer (PC) URL associated with the search target;
   determining, using the at least one processor, a validity of the mobile URL by determining that the mapped mobile URL redirects a web browser, includes a mobile option in a metatag, or has a mobile related character string in the mapped mobile URL, the determining including determining a validity of a mapping of the mobile URL to the PC URL of the search target, the validity of the mapping being based on at least one of a value indicating to redirect the collected mobile URL, a value indicating whether a mobile option is included in a meta tag, and a value indicating that a URL string pattern has been verified; and providing, using the at least one processor, the valid mobile URL in the search result based on the determining by including the mobile URL with a personal computer (PC) URL associated with the search target in the search result when the PC URL is included in the website information of the search target and the PC URL is displayed in the search result.

8. The method of claim 7, wherein the collecting of the mobile URL comprises:
collecting the mobile URL using characteristic information associated with a user agent of the mobile terminal.

9. The method of claim 7, wherein the collecting of the mobile URL comprises:
collecting the mobile URL by extracting the mobile URL from link information that is associated with the PC URL of the search target.

10. The method of claim 7, wherein the collecting of the mobile URL comprises:
collecting the mobile URL by extracting the mobile URL from a web document associated with the search target.

11. The method of claim 7, wherein the collecting of the mobile URL comprises:
collecting the mobile URL by extracting the mobile URL from a uniform resource identifier (URI) of a landing page of the search target.

12. The method of claim 7, wherein the collecting of the mobile URL comprises:
collecting the mobile URL when the PC URL of the website information is included in the search result.

13. A non-transitory computer-readable storage medium comprising computer readable instructions that, that when executed by at least one processor, cause the at least one processor to:
collect a mobile uniform resource locator (URL) associated with a search target of a search query received from the mobile terminal, the search target including website information, the website information being included in a search result of the search service, the mobile URL associated with a website of the search target designed for display on a mobile environment;
map the collected mobile URL with a personal computer (PC) URL associated with the search target;
determine a validity of the mobile URL by determining that the mapped mobile URL redirects a web browser, includes a mobile option in a metatag, or has a mobile related character string in the mapped mobile URL,
wherein the at least one processor is further configured to determine a validity of a mapping of the mobile URL to the PC URL of the search target, the validity of the mapping is based on at least one of a value indicating to redirect the collected mobile URL, a value indicating whether a mobile option is included in a meta tag, and a value indicating that a URL string pattern has been verified; and provide the valid mobile URL in the search result based on the determined validity of the mobile URL by including the mobile URL with a personal computer (PC) URL associated with the search target in the search result when the PC URL is included in the website information of the search target and the PC URL is displayed in the search result.

14. A mobile uniform resource locator (URL) providing server for providing a search service to a mobile terminal, the server comprising:
a memory having computer readable instructions stored thereon; and
at least one processor configured to execute the computer readable instructions to,
receive a search query from the mobile terminal;
collect a mobile URL associated with a search target, the search target is to be provided to the mobile terminal as part of a search result based on the received search query, the mobile URL associated with a website of the search target designed for display on a mobile environment;
map the collected mobile URL with a personal computer (PC) URL associated with the search target;
determine a validity of the mobile URL by determining that the mapped mobile URL redirects a web browser, includes a mobile option in a metatag, or has a mobile related character string in the mapped mobile URL,
wherein the validity of the mapping is based on at least one of a value indicating to redirect the collected mobile URL, a value indicating whether a mobile option is included in a meta tag, and a value indicating that a URL string pattern has been verified; and
provide the valid mobile URL to the mobile terminal by including the mobile URL with a personal computer (PC) URL associated with the search target in the search result when the PC URL is included in the website information of the search target and the PC URL is displayed in the search result.

15. The mobile URL providing sever of claim 14, wherein the at least one processor is configured to collect the mobile URL using characteristic information associated with a user agent of a mobile device, the characteristic information including at least one of an application type, operating system (OS) information, a software vendor, a software version, a URL, and an email address.

16. The mobile URL providing sever of claim 14, wherein the search query is to be provided to a third party search service, and in the receiving, the at least one processor is further configured to:
intercept the search query.

17. The mobile URL providing sever of claim 14, wherein, in the providing, the at least one processor is further configured to:
determine a user demand associated with the mobile URL; and
provide the mobile URL to the mobile terminal based on the determined user demand.

* * * * *